United States Patent
Moran

(10) Patent No.: US 11,816,471 B2
(45) Date of Patent: Nov. 14, 2023

(54) DEVICE, DEVICE INITIALISATION AND METHOD OF INSTALLING A DELTA UPDATE OF EXECUTABLE CODE ON A DEVICE

(71) Applicant: Arm IP Limited, Cambridge (GB)

(72) Inventor: Brendan James Moran, Histon (GB)

(73) Assignee: Arm IP Limited, Cambridge (GB)

( * ) Notice: Subject to any disclaimer, the term of this patent is extended or adjusted under 35 U.S.C. 154(b) by 119 days.

(21) Appl. No.: 17/648,058

(22) Filed: Jan. 14, 2022

(65) Prior Publication Data

US 2022/0229656 A1     Jul. 21, 2022

(30) Foreign Application Priority Data

Jan. 19, 2021    (GB) ...................................... 2100680

(51) Int. Cl.
   *G06F 9/44*     (2018.01)
   *G06F 8/65*     (2018.01)
   *G06F 8/61*     (2018.01)

(52) U.S. Cl.
   CPC . *G06F 8/65* (2013.01); *G06F 8/61* (2013.01)

(58) Field of Classification Search
   CPC .......................................................... G06F 8/65
   USPC ......................................................... 717/168
   See application file for complete search history.

(56) References Cited

U.S. PATENT DOCUMENTS

| 4,636,940 A | * | 1/1987 | Goodwin, Jr. | .......... G06F 11/25 714/39 |
| 7,953,980 B2 | * | 5/2011 | Schluessler | ............. G06F 21/54 713/180 |
| 8,364,973 B2 | * | 1/2013 | Khosravi | ................ G06F 21/64 726/22 |

OTHER PUBLICATIONS

Combined Search and Examination Report for GB Application No. 2100680.4 dated Nov. 2, 2021, 11 pages.
W. Dong et al, "R2: Incremental Reprogramming Using Relocatable Code in Networked Embedded Systems" IEEE Transactions on Computers, vol. 62, Jun. 25, 2012, 13 pages.
W. Dong et al, "Enabling efficient reprogramming through reduction of executable modules in networked embedded systems" Ad Hoc Networks, vol. 11, pp. 473-489, Jul. 7, 2012.
R.K. Panta et al, "Mitigating the Effects of Software Component Shifts for Incremental Reprogramming of Wireless Sensor Networks" IEEE Transactions on Parallel and Distributed Systems, vol. 23, No. 10, Oct. 2012, pp. 1882-1894.

* cited by examiner

*Primary Examiner* — Evral E Bodden
(74) *Attorney, Agent, or Firm* — NIXON & VANDERHYE P.C.

(57) ABSTRACT

A device, device initialisation and method of installing a delta update of executable code on a device, the method comprising: generating an unrelocation table based upon a symbol table and a relocation table associated with relocatable code by: identifying an entry in the relocation table that references a symbol in the symbol table; and storing in the unrelocation table the relocated address of the identified entry in the relocation table; generating a first executable program code based upon the symbol table, the relocation table, and the relocatable code; and storing the first executable program code and the unrelocation table on the device.

13 Claims, 7 Drawing Sheets

FIGURE 4B

UN-RELOCATION TABLE

| 1010 |
| 1030 |
| 2030 |
| 2048 |

UN-RELOCATION TABLE 600

| ADDRESS | TYPE |
|---------|------|
| 1010 | br |
| 1030 | ld |
| 2030 | br |
| 2048 | br |

FIGURE 6A

UN-RELOCATION TABLE 602

| ADDRESS | TYPE | REFERENCE |
|---------|------|-----------|
| 1010 | br | 3000 |
| 1030 | ld | gA |
| 2030 | br | 3000 |
| 2048 | br | 1000 |

FIGURE 6B

DEVICE, DEVICE INITIALISATION AND METHOD OF INSTALLING A DELTA UPDATE OF EXECUTABLE CODE ON A DEVICE

CROSS-REFERENCE TO RELATED APPLICATIONS

This application claims priority pursuant to 35 U.S.C. 119(a) to United Kingdom Patent Application No. 2100680.4, filed Jan. 19, 2021, which application is incorporated herein by reference in its entirety.

BACKGROUND

The present techniques relate to a method of initialising a device in preparation for receiving a delta update of executable code and also to a method of installing a delta program update onto an initialised device. More particularly, the techniques relate to the generation of an unrelocation table based upon a symbol table and a relocation table associated with relocatable code. Present techniques enable a low memory, low bandwidth and low power consumption overhead for delta updates.

Cloud computing services are becoming more common. More and more devices are being connected to the cloud, for example as part of the "Internet of Things". For example, relatively small devices such as temperature sensors, healthcare monitors and electronic door locks can be connected to the cloud so that they can be accessed and controlled using remote systems. For example, the door may be remotely opened from a remote platform, or data from a temperature sensor or healthcare monitor may be aggregated at a remote location and accessed from another device. Hence, there is an increasing amount of data being collected by cloud platforms and their providers.

All electronic devices consume resources in the form of power, communication bandwidth over buses and networks, memory footprints, storage requirements, redundancy and backup requirements, and the like. Relatively small devices are often constrained in battery power, network bandwidth, memory allocation and other resources and such constrained resources present problems to developers of such systems.

A differential update, also known as a delta update, is an update comprising only the code of a program that has changed. Such an update is desirable since a user is only required to download the update as opposed to the whole program. However, differential updates can be problematic when a piece of code is moved within the program, resulting in the address of the code being changed, such a move having a ripple effect on the whole program, requiring other pieces of code to also be moved. This then results in a larger differential update, since although a lot of the code has not changed, its position in the program has moved and thus its address changed. Consequently, it is difficult to achieve good compression of the update. In order to tackle this problem, many systems use relocatable code.

SUMMARY

FIG. 1 illustrates schematically a program 100 including a plurality of blocks 102, 104, 106, 108 of executable code. Each block of code 102 . . . 108 may be, for example, a function. As known in the art, in order to overcome the problem of moved code creating large differential updates, each block of code 102 . . . 108 is assigned a symbol (A, B, C, D, . . . ) and a symbol table, such as illustrated below, may be used to represent the position of each block of code 102 . . . 108 within the program 100.

TABLE 1

| SYMBOL TABLE | | |
|---|---|---|
| Code symbol | Position | |
| A | 0 | |
| B | (A) | Code B is provided at the size of A |
| C | (A + B) | Code C is at the size of A + B |
| D | (A + B + C) | Code D is at the size of A + B + C |

Each block of code 102 . . . 108 may include one or more references to another block of code within the program. For example, as illustrated in FIG. 1, Block 102, code symbol A, at address x includes a reference 110 to block 108; code symbol A and at address y includes a reference 112 to block 104 code symbol B; Block 106, code symbol C, at address z includes a reference 114 to block 102, code symbol A; and block 108, code symbol D, at address v includes a reference 116 to block 106, code symbol C.

Relocatable code is generated, the relocatable code being the program code 100 including placeholders at each reference to another block of code 102 . . . 108 instead of an actual address, since the actual address of the block of code is not fixed (it may have moved as a result of an update). As will be appreciated by a person skilled in the art, the relocatable code is not executable code. FIG. 2 illustrates schematically, the relocatable code 200 of FIG. 1 including placeholders 202, 204, 206, 208 at each reference 110, 112, 114, 116 to another block of code.

A relocation table is generated indicating the address at which each function/block of code is required—since a function may be repeated more than once through a program.

TABLE 2

| RELOCATION TABLE | |
|---|---|
| x: D | At address x put function D |
| y: B | At address y put function B |
| z: A | At address z put function A |
| v: C | At address v put function C |

By using a symbol table, a relocation table and relocatable code, the size of a differential update can be kept small, even when a piece of code is moved within the program resulting in a ripple effect.

When installing a program at a device, a linker runs through the relocatable code and using the symbol and relocation table fills in the blanks and links up the program code to generate the executable code. For example, at address x where there is a placeholder 202, the relocation table is used to determine that a reference to function D should be inserted, and the symbol table is used to determine that function D, is at a position the size of A+B+C.

Therefore, in order to install a program at a device, a relocation table, a symbol table and relocatable code are provided. Following installation, the executable program (firmware or software) is provided at the device.

When an update of a program is available, a delta update is generated. The delta update comprises the differences between the installed symbol table and an updated symbol table, the installed relocation table and an updated relocation table and the installed relocatable code and updated relocatable code.

A known system for installing delta updates at a device is R2™-Delta Upgrade. Initially the R2™ system provides a symbol table, a relocation table and the relocatable code derived for an executable program to a device, and once installed, the device stores a copy of the executable program (firmware or software). In order to be able to install delta updates the device is required to store not only a copy of the executable program but also a copy of the symbol table, the relocation table and the relocatable code.

When a delta update is received at an R2™ device, the delta update comprises an update symbol table, update relocation table and update relocatable code, the device performs a comparison to determine the delta update. The device compares the update symbol table with the installed symbol table, the update relocation table with the installed relocation table and update relocatable code with the installed relocatable code to determine the delta update. The delta update is then installed at the device. Although the R2™ devices are capable of receiving small delta updates, a copy of the symbol table, the relocation table and the relocatable code is required to be stored at the R2™ device as well as the executable program code, so that a comparison can be performed when a delta update is received. This achieves the aim of a providing small delta updates, but requires a large storage space at the device, which may not be available at constrained devices.

Another known system for installing delta updates at a device is Google™ Courgette™. The Courgette™ system addresses the problem associated with the R2™ system of the requiring to a copy of the program, the symbol table, the relocation table and the relocatable code at the device. However, the Courgette™ system requires greater processing capacity than the R2™ system.

Similar to the R2™ system described above, initially the Courgette™ system provides a symbol table, a relocation table and the relocatable code derived for an executable program to a device, and once installed the device comprises a copy of the executable program (firmware or software). Unlike the R2™ system, the Courgette™ system is only required to store a copy of the executable program, not a copy of the symbol table, the relocation table and the relocatable code.

However, when a delta update is received at a Courgette™ device, the delta update comprising an update symbol table, update relocation table and update relocatable code, the device still requires an installed symbol table, installed relocation table and installed relocatable code in order to perform a comparison and determine the differences. Therefore, a Courgette™ device disassembles the installed program in order to extract the installed symbol table, installed relocation table and installed relocatable code from the program code. The symbol table and relocation table are extracted from the program code and then the code is un-relocated using the symbol table and relocation table. Once the installed symbol table, installed relocation table and installed relocatable code have been extracted, the Courgette™ device compares the update symbol table with the installed symbol table, update relocation table with the installed relocation table and update relocatable code with the installed relocatable code to determine the delta update. The delta update is then installed at the device.

Although the Courgette™ devices are capable of receiving small delta updates, the Courgette™ devices require large processing capabilities in order to extract the symbol table, relocation table and relocatable code from the installed program code. Consequently, the Courgette™ system is also not suitable for constrained devices. The net result of the Courgette™ system is the same as R2™ system.

BRIEF DESCRIPTION OF THE DRAWINGS

Embodiments will now be described with reference to the accompanying figures of which:

FIG. 4A illustrates schematically executable code;

FIG. 4B illustrates schematically an unrelocation table for the executable code illustrated in FIG. 4A;

FIG. 6A illustrates schematically another unrelocation table for the executable code illustrated in FIG. 4A;

FIG. 6B illustrates schematically another unrelocation table for the executable code illustrated in FIG. 4A.

DETAILED DESCRIPTION

Figure 1:
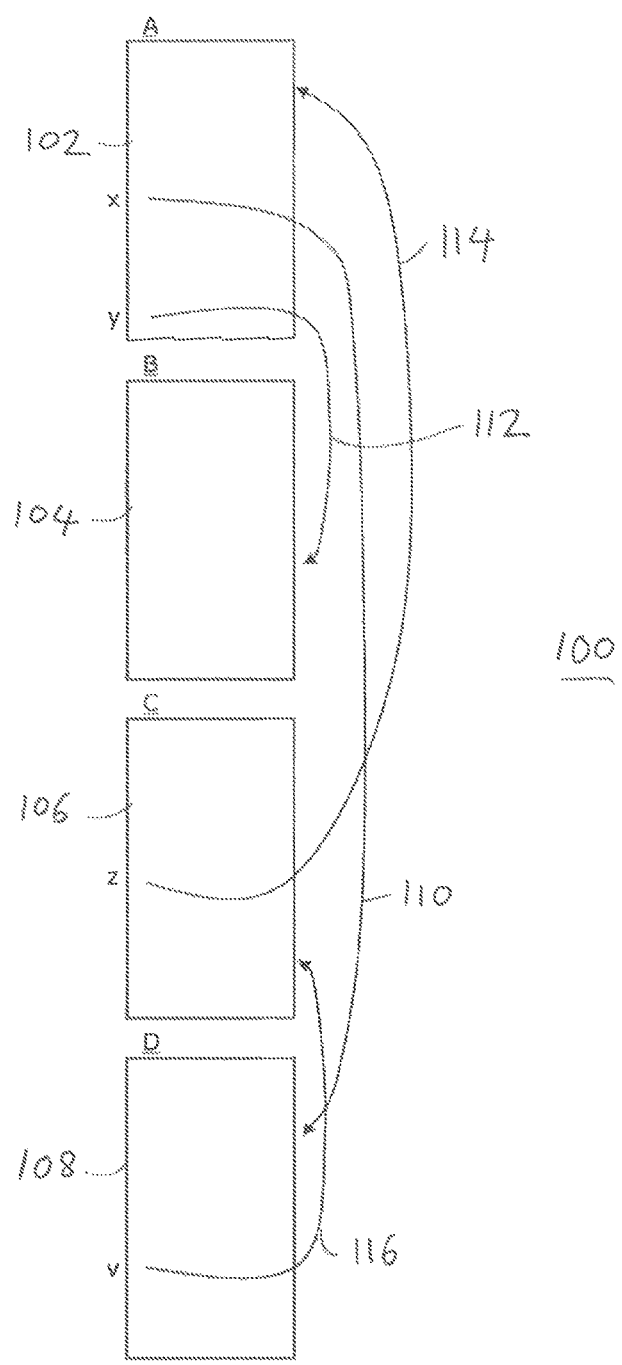
FIG. 1 illustrates schematically a program including a plurality of block of codes.
Figure 2:
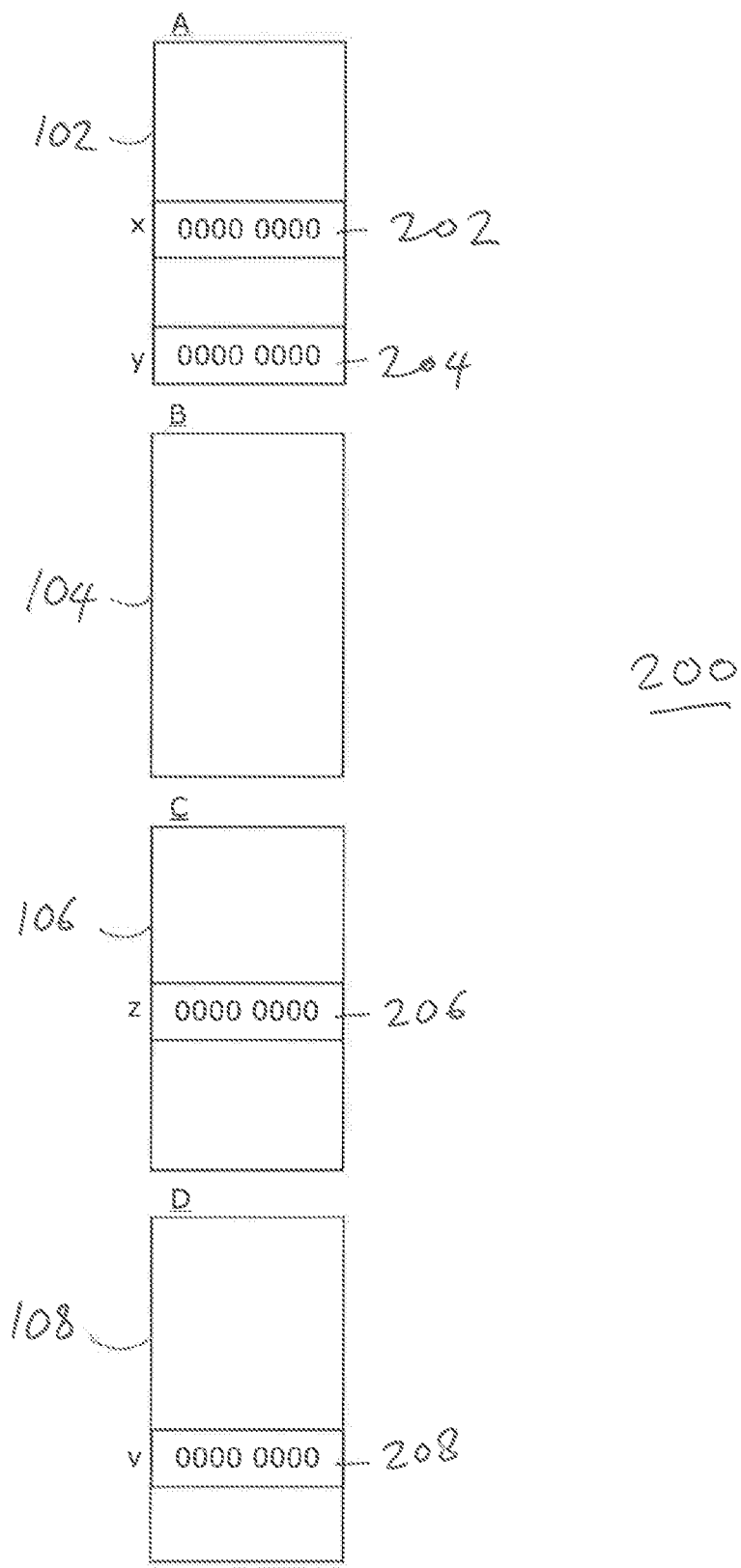
FIG. 2 illustrates schematically relocatable code.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

According to a first technique, there is provided a method of initialising a device for a delta update of executable code, the method comprising: generating an unrelocation table based upon a symbol table and a relocation table associated with relocatable code by:

identifying an entry in the relocation table that references a symbol in the symbol table; and storing in the unrelocation table the address of the identified entry in the relocation table; generating a first executable code based upon the symbol table, the relocation table, and the relocatable code; and storing the first executable code and the unrelocation table on the device, wherein, upon receiving the delta update, the first executable code and the unrelocation table are used to reconstruct the relocation table, the symbol table, and the relocatable code for installation of the delta update at the device.

In embodiments, the method includes storing in the unrelocation table an index of the type of reference at each address. In embodiments, the method includes for each relocation table entry, determining a corresponding address in the relocatable code and decoding a reference from the relocatable code; and inserting the reference into the symbol table, optionally deleting duplicated entries.

In embodiments, the method includes for each relocation table entry, determining a corresponding address and index (symbol) in the relocatable code and decoding a reference from the relocatable code; and inserting the reference into the symbol table, e.g. at the index. Generating an unrelocation table may occur on the device or be generated outside of the device and copied to the device. In embodiments the method may include generating at runtime the first executable program code and generating at runtime the unrelocation table based upon the symbol table and the relocation table associated with relocatable code. The method may include receiving the symbol table, the relocatable code and the relocation table at the device.

According to a second technique, there is provided a device having in a memory store a first executable program code and an unrelocation table, the first executable code based upon a symbol table, a relocation table and relocatable code, and the unrelocation table comprising a list of addresses, each address of the unrelocation table being a reference to an identified entry in the relocation table that references a symbol in a symbol table.

In another aspect, the present techniques provide a data processing device to perform a method of initialising a device for a delta update of executable code, the method comprising: generating an unrelocation table based upon a symbol table and a relocation table associated with relocatable code by: identifying an entry in the relocation table that references a symbol in the symbol table; and storing in the unrelocation table the address of the identified entry in the relocation table; generating a first executable code based upon the symbol table, the relocation table, and the relocatable code; and storing the first executable code and the unrelocation table on the device, wherein, upon receiving the delta update, the first executable code and the unrelocation table are used to reconstruct the relocation table, the symbol table, and the relocatable code for installation of the delta update at the device.

In a further aspect, the present techniques provide a computer-readable medium comprising machine-readable code which, when executed by a processor, causes the processor to: generate an unrelocation table based upon a symbol table and a relocation table associated with relocatable code by: identify an entry in the relocation table that references a symbol in the symbol table; store in the unrelocation table the address of the identified entry in the relocation table; generate a first executable code based upon the symbol table, the relocation table, and the relocatable code; and store the first executable code and the unrelocation table on the device, wherein, upon receiving the delta update, the first executable code and the unrelocation table are used to reconstruct the relocation table, the symbol table, and the relocatable code for installation of the delta update at the device.

According to a third technique, there is provided a method of installing a delta program update on a device that stores a first executable program code and an unrelocation table, the method comprising: generating a symbol table for the first executable program code from the unrelocation table and the first executable program code; generating a first relocatable code from the first executable code and the unrelocation table; generating a relocation table for the first executable program code from the symbol table, the unrelocation table, and the first executable program code; and applying a corresponding delta program update to each of the symbol table, relocation table, and the first relocatable program code.

In a preferred embodiment, the device has stored thereon first executable code and an unrelocation table by: generating an unrelocation table based upon a symbol table and a relocation table associated with relocatable code by: identifying an entry in the relocation table that references a symbol in the symbol table; storing in the unrelocation table the address of the identified entry in the relocation table; generating a first executable code based upon the symbol table, the relocation table, and the relocatable code; and storing the first executable code and the unrelocation table on the device.

In a preferred embodiment the method includes installing the corresponding delta program update on the device; generating an updated unrelocation table and an updated first executable code based upon the updated symbol table, the updated relocation table, and the updated first relocatable program code; and storing the updated first executable program code and the updated relocation table on the device.

In another aspect, the present techniques provide a data processing device to perform the method of installing a delta program update on a device as described above.

In a further aspect, the present techniques provide a computer-readable medium comprising machine-readable code which, when executed by a processor, causes the processor to perform the method of installing a delta program update on a device as described above.

In other instances, well known methods, procedures, components and/or circuitry have been described at a relatively high-level, without detail, in order to avoid unnecessarily obscuring aspects of the present teachings.

Present techniques use a delta update comprising the differences between an installed symbol table and an update symbol table and an installed relocation table and an updated relocation table. However, unlike the R2™ system, the present techniques do not require a device to store a copy of the symbol table, the relocation table and the relocatable code. In addition, unlike the Courgette™ system, present techniques do not require each device to disassemble the executable program in order to generate the symbol table, the relocation table and the relocatable code.

Figure 3:
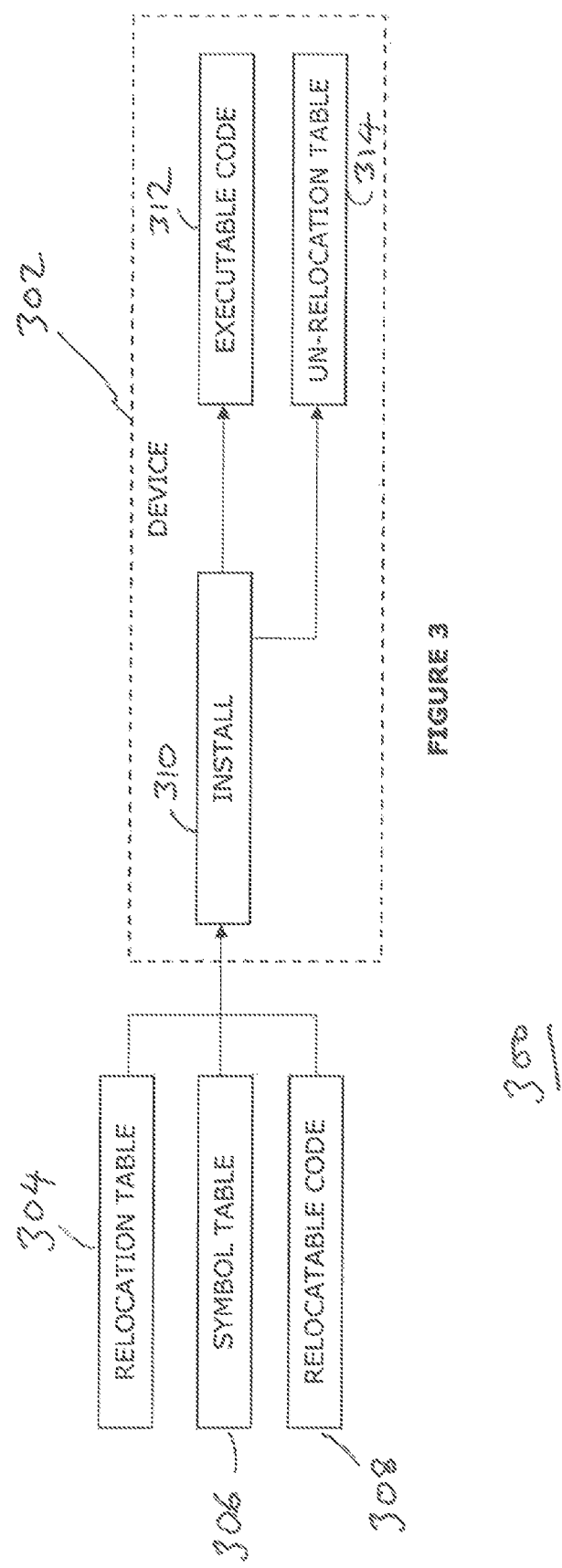
FIG. 3 illustrates schematically initial installation of program code at a device.

As illustrated schematically in FIG. 3, initially, a program 300 is provided to a device 302 as a relocation table 304, a symbol table 306 and relocatable code 308. When installed 310 at the device, for the first time, the device generates executable program code 312 (which may be firmware or software) and an unrelocation table 314. The device 302 stores the executable code 312 and the unrelocation table 314. The device 302 is not required to disassemble the executable code 312 in order to generate the unrelocation table 314, the unrelocation table 314 is generated during the installation 310 of the program 300 at the device 302.

During installation 310 of the program 300 (for example by stepping/working through the relocation table), whenever an address is encountered which includes a reference to another block of code, an entry is made in an unrelocation table of that address, so the unrelocation table is created incrementally. For each address, index, encoding in the relocation table, a target address is loaded as a symbol table[index] and a write of the target address to relocatable code[address] is made using encoding.

The relocation table may contain an indication of the type of reference at "address", which can be any of: a bare address, a pc-relative branch or an absolute branch. Other encoding types are available based on compiler output across differing architectures.

FIG. 4A illustrates schematically some executable code 400, whilst FIG. 4B illustrates schematically an unrelocation table 402 including entries for the executable code 400 illustrated in FIG. 4A. The executable code 400 of FIG. 4A includes: at address 1010, a reference br (branch) to address 3000; at address 1030, a reference ld (load) to gA (global data A), at address 2030, a reference br (branch) to address 3000; and at address 2048, a reference br (branch) to address 1000. The generated unrelocation table 402 of FIG. 4B comprises a list of the addresses which include reference being a link to a function. However, the unrelocation table 402 does not include the references. Since the unrelocation table 402 only includes the addresses which have a reference to another block of code, the unrelocation table 402 is relatively small in memory requirement. Consequently, the storage space required at a device is smaller than that required by the R2™ system.

In embodiments, the unrelocation table contains a type identifier for each reference, which may come at a cost of increased memory consumption. Accordingly, in embodiments several unrelocation tables may be used; one for each type of reference. In embodiments, a type identifier in the relocation table may be removed if one relocation table were included for each type of reference.

In a further embodiment, there is only one table. It is sorted by reference type, then by address. Since the reference type is redundant once the table is sorted by reference type, the index of the first element of each type is retained, and the types of reference are pruned.

For example, where there are two types of reference, X and Y. The raw relocation table can be represented by the following:

1010: 1, X
1030: gA, Y
2030: 1, X
2048: 0, X

A type-sorted relocation table can be represented by:

X:0, Y:3
1010:1
2030:1
2048:0
1030:gA

A type-sorted unrelocation table can be represented by:

X:0, Y:3
1010
2030
2048
1030

From the installed executable code 400 and the unrelocation table 402, stored at the device, it is possible to determine a relocation table, a symbol table and relocatable code.

Consequently, when a delta update is received at a device, the executable program code 400 and the unrelocation table 402, stored at the device, is used to reconstruct the relocation table, symbol table and relocatable code, such that the delta update may be installed at the device.

Figure 5:
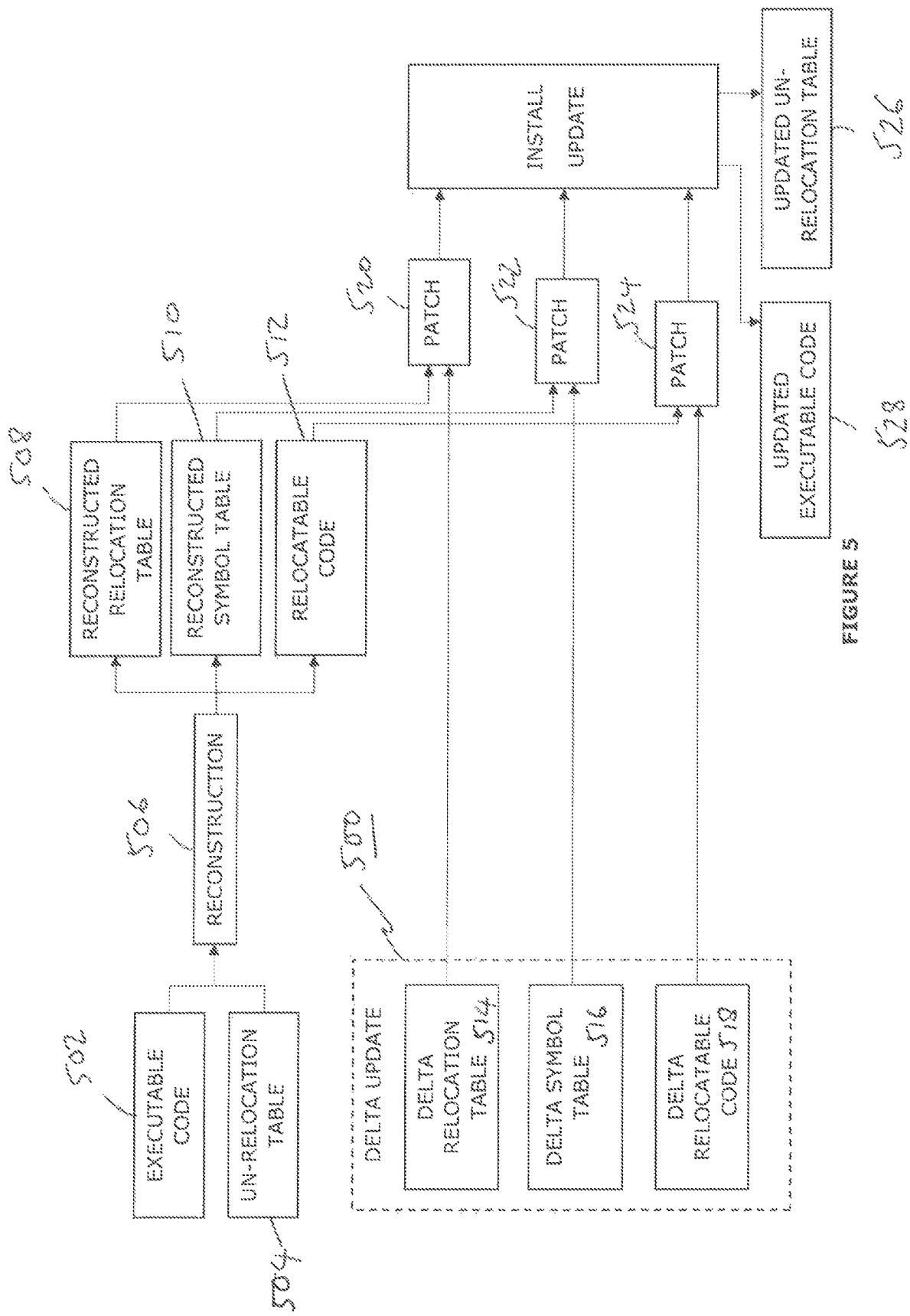
FIG. 5 illustrates schematically installation of an update at a device.

FIG. 5 illustrates schematically the receipt of a delta update 500 at a device. The executable code 502 and the unrelocation table 504 are used to reconstruct 506 a relocation table 508, a symbol table 510 and relocatable code 512.

The unrelocation table 504 includes a list of addresses at which there is a reference. Therefore, when "reconstructing" at 506, the executable code 502 is used to determine the reference at each of the addresses stored in the unrelocation table 504. Referring back to FIG. 4B, the unrelocation table 402 includes the addresses 1010, 1030, 2030 and 2048. From the executable code 502 it is determined that at address 1010 there is a reference br to 3000, at address 1030 there is a reference ld to gA, at address 2030 there is a reference br to 3000, at address 2048 there is a reference br to 1000.

TABLE 3

RECONSTRUCTION TABLE

| Address | Reference |
|---------|-----------|
| 1010    | 3000      |
| 1030    | gA        |
| 2030    | 3000      |
| 2048    | 1000      |

The references may be compiled in a separate table, sorted numerically, and any repetitions removed, resulting in a list of references which appear once or more in the executable code. These references may then be assigned a symbol, resulting in the symbol table being generated and shown at Table 4. In embodiments, the symbol may be the index of the entry in the symbol table.

TABLE 4

RECONSTRUCTED SYMBOL TABLE 510

| Reference | Symbol |
|-----------|--------|
| 1000      | 0      |
| 3000      | 1      |
| gA        | 2      |

From the reconstruction Table 3 and the reconstructed symbol table, it is then possible to generate a relocation table 508, by replacing each reference with a symbol.

TABLE 5

RECONSTRUCTED RELOCATION TABLE 508

| Address | Symbol |
|---------|--------|
| 1010    | 1      |
| 1030    | 2      |
| 2030    | 1      |
| 2048    | 0      |

Patches 520, 522, 524 are the differences between the current version of executable code 502 and the desired version of executable code 528 and once a patch is applied to the current version 502, the result should be an updated program 528. The updated program is then installed at the device. As with the previous version of the program, during installation an updated unrelocation table 526 is generated, and the updated unrelocation table 526 is stored at the device together with the updated executable code 528.

As illustrated in FIG. 4B, the unrelocation table 402 may comprise just the addresses which include a reference to another block of code. However, according to another embodiment, the unrelocation table 402 may also include an indication as to the type of reference at each address, i.e. a branch, branch & offset, indirect load, indirect load & offset, etc. as indicated in FIG. 6A at 600.

According to another embodiment, the unrelocation table may also include an indication of the reference, as indicated in FIG. 6B at 602. In the another embodiment, the unrelocation table may be identical to the relocation table. That is, the unrelocation table contains address, type, and symbol. This allows an optimisation where the symbol table does not need to be sorted because the symbol addresses are installed into the symbol specified in the unrelocation table as they are read out of the installed executable code. As discussed, the symbol could be as simple as the index of the entry in the symbol table.

Figure 7:
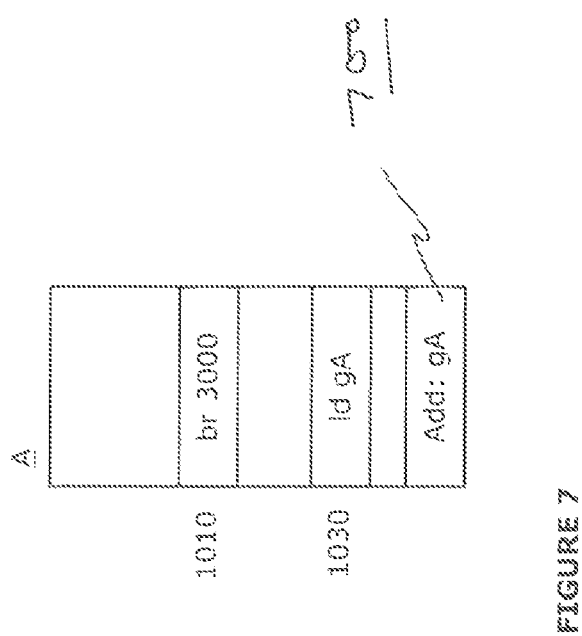
FIG. 7 illustrates schematically another unrelocation table comprising global data.

The amount of storage space required at each device is less than the R2™ system. In addition, the above described system is also able to handle global data. Global variables are retained in RAM, while global constants are typically stored with code. As with the code, if global data is moved, the same ripple effect may also result. Consequently, at the end of each block of code (function) may be provided a list of the addresses of the global data called by that function, as illustrated in FIG. 7 at 700.

Techniques disclosed herein provide for an unrelocation table in order to minimise memory requirements in devices constrained in battery power, network bandwidth, memory allocation and other resources.

To reduce memory requirements, the unrelocation table is used. In embodiments, only a list of addresses is retained, allowing a minimum of space to be used. Even the reference type may be encoded in the way that the unrelocation table is sorted. This approach has the advantage of minimum stored size although requires reconstructing a symbol table and relocation table, which may add to overheads in processing requirements. Reconstructing the symbol table, in particular, requires finding and sorting all unique symbols. This approach may be simplified if the unrelocation table contains a symbol for each reference (such as an index).

Now, reconstructing the symbol table is made efficient by filling in the symbol/reference pairs. In such embodiments, the unrelocation table may be identical to the relocation table. For further simplification, the symbol table may be retained leaving just a need to reconstruct the relocatable code. Accordingly, whilst the unrelocation table is a mechanism that allows conversion from executable to relocatable code, if the relocation table allows us to perform the same task (albeit with more storage consumed), we may obtain similar effects as with the unrelocation table.

Base Addresses:

Since the code is relocatable, it can be installed to a different base address from the first executable image. This would allow an update to be installed to any one of several "slots" on a constrained device, which allows that device to keep backups of previous images and choose between them on boot, based on application-specific logic, such as rollback for reliability reasons.

Reference Types:

A reference type may be considered as an identifier of the encoding of a reference. To generate the correct result, the relocation engine needs to know how to encode a reference at any given location. To correctly interpret a reference in order to extract a symbol, the unrelocation engine needs to know how to decode the reference. In this way, reference types are effectively an encoding identifier.

In embodiments, the reference type of each reference is retained in the unrelocation table. The relocation table could omit this if it used the relocatable code to determine the type of reference. This would be done by making bare addresses zero-filled, while leaving instruction-based references (jumps and the like) as the encoded instruction with any reference, including 0. The relocation engine can then determine the type and correct encoding of the reference from the relocatable code.

It is likely that there are few unique types of reference. This being the case, some additional benefit may be gained from discarding the type identifier as follows: sort the unrelocation table by type, then record the index into the unrelocation table of the first instance of each type, then sort each group of the same type by address, then prune all types. The type of each reference in the unrelocation table is clear, but the type is not included with each reference. To simplify the reconstruction of the relocation table, it can be grouped in the same way. Then, the only complexity lies in relocating the code. This process would involve maintaining an index of the next element in each type, so that references in the relocatable code can be filled in-order.

Using the Relocation Table for Unrelocation:

If the relocation table contains a type identifier (or is sorted by type as described above) then the relocation table itself may be used as an unrelocation table. This is still substantially different from Zephyr, and R2 in that the original relocatable code is reconstructed from the installed code. This is still substantially different from Courgette in that it is done through the use of additional metadata that is retained on-device. This makes reconstructing the symbol table trivial, however the symbol table could optionally be retained.

Further examples are considered as part of present techniques. For both secure/measured boot and attestation, it may be possible to verify the signature of the resulting image. This creates the need to be able to compute an invariant signature, no matter the base address of an image. To accomplish this, we can use the unrelocation table again, reconstructing the (zero-base address) symbol table, relocation table, and relocatable code, in a corresponding way as we would for a delta update, then signing these in aggregate. While the relocation table would need to be held in memory, the relocatable code could be streamed through the signature algorithm, which means that it could be computed on the fly and discarded. Depending on whether it is needed for installing type information in the relocatable code, the symbol table could also be discarded after it is consumed by the signature algorithm.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware. Present techniques may be embodied as a data processing device operationally capable of carrying out the method.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

In general, present techniques may comprise of initialising a device for a delta program update, the method comprising: receiving at the device a first executable program comprising a relocation table, a symbol table and relocatable code; generating at runtime an executable program code from the first executable program; generating at runtime an unrelocation table by identifying an address in the first executable program code that makes a reference to another block of code in the first executable program code and incrementally making an entry of the address in the unrelocation table; and storing the first executable program code and the unrelocation table on the device.

Further present techniques may be generalised as a method of installing a delta program update on an initialised device as discussed herein, the method comprising: determining the reference to another block of code in the first executable program code at each address stored in the unrelocation table and forming a reconstruction table including a list of addresses and references which appear once or more in the first executable program code; assigning each reference a symbol and forming a reconstructed symbol table including a list of assigned references and symbols; generating a reconstructed relocation table by replacing each reference in the reconstruction table with a symbol assigned to a reference in the reconstructed symbol table; and updating:

i. the reconstructed relocation table with a received delta relocation table;
ii. the reconstructed symbol table with a received delta symbol table;
iii. the relocatable code with a received delta relocatable code; and installing the device with the delta program update being a difference between the received delta update and the first executable program.

What is claimed is:

1. A method of initialising a device for a delta update of executable code, the method comprising:
   generating an unrelocation table based upon a symbol table and a relocation table associated with relocatable code by:
   identifying an entry in the relocation table that references a symbol in the symbol table;
   storing in the unrelocation table the address of the identified entry in the relocation table;
   generating a first executable code based upon the symbol table, the relocation table, and the relocatable code; and
   storing the first executable code and the unrelocation table on the device, wherein, upon receiving the delta update, the first executable code and the unrelocation table are used to reconstruct the relocation table, the symbol table, and the relocatable code for installation of the delta update at the device.

2. A method as claimed in claim 1, the method including storing in the unrelocation table a symbol of the type of reference at each address.

3. A method as claimed in claim 1, the method including for each unrelocation table entry, determining a corresponding address in the relocatable code and decoding a reference from the relocatable code; and inserting the reference into the symbol table, optionally deleting duplicated entries.

4. A method as claimed in claim 2, the method including for each relocation table entry, determining a corresponding address and symbol in the relocatable code and decoding a reference from the relocatable code; and inserting the reference into the symbol table.

5. A method as claimed in claim 4, wherein the symbol is an index of the type of reference at each address.

6. A method as claimed in claim 1, wherein generating an unrelocation table occurs on the device.

7. A method as claimed in claim 1, including generating at runtime the first executable code and generating at runtime the unrelocation table based upon the symbol table and the relocation table associated with relocatable code.

8. A method as claimed in claim 1, including receiving the symbol table, the relocatable code and the relocation table at the device.

9. A non-transitory computer-readable medium comprising machine-readable code which, when executed by a processor, causes the processor to:
   generate an unrelocation table based upon a symbol table and a relocation table associated with relocatable code by:
   identify an entry in the relocation table that references a symbol in the symbol table;
   store in the unrelocation table the address of the identified entry in the relocation table;
   generate a first executable code based upon the symbol table, the relocation table, and the relocatable code; and
   store the first executable code and the unrelocation table on the device, wherein, upon receiving the delta update, the first executable code and the unrelocation table are used to reconstruct the relocation table, the symbol table, and the relocatable code for installation of the delta update at the device.

10. A method of installing a delta update on a device having stored thereon first executable code and an unrelocation table, by:
   generating an unrelocation table based upon a symbol table and a relocation table associated with relocatable code by:
   identifying an entry in the relocation table that references a symbol in the symbol table;
   storing in the unrelocation table the address of the identified entry in the relocation table;
   generating a first executable code based upon the symbol table, the relocation table, and the relocatable code; and
   storing the first executable code and the unrelocation table on the device, the method of installing comprising:
   generating a symbol table for the first executable code from the unrelocation table and the first executable code;
   generating a first relocatable code from the first executable code and the unrelocation table;
   generating a relocation table for the first executable code from the symbol table, the unrelocation table, and the first executable code; and applying a corresponding delta update to each of the symbol table, relocation table, and the first relocatable code.

11. A method as claimed in claim 10, the method including:
   installing the corresponding delta update on the device;
   generating an updated unrelocation table and an updated first executable code based upon the updated symbol table, the updated relocation table, and the updated first relocatable code; and
   storing the updated first executable code and the updated unrelocation table on the device.

12. A method as claimed in claim 10, the method including:
   installing the corresponding delta update on the device;
   generating an updated unrelocation table and an updated first executable code based upon the updated symbol table, the updated relocation table, and the updated first relocatable code; and
   storing the updated first executable code and the updated relocation table on the device.

13. A method as claimed in claim 10, the method including converting executable code to relocatable code.

* * * * *